United States Patent Office 3,280,046
Patented Oct. 18, 1966

3,280,046
POLYOL ETHER RESINS AND UTILITY
Melvin J. Hatch, Midland, Mich., assignor to The Dow Chemical Company, Midland, Mich., a corporation of Delaware
No Drawing. Filed Mar. 2, 1964, Ser. No. 348,823
12 Claims. (Cl. 260—2.1)

This application is a continuation-in-part of U.S. patent application Serial No. 268,472, filed March 27, 1963, now abandoned.

This invention concerns novel polyol ether resins and their utility in selectively sorbing Group IIIA, IVA, VA and VIA metal and metalloid oxy anions from aqueous solutions, even those also containing high concentrations of light and heavy metal cations and other oxy anions.

The resins of this invention are insoluble, crosslinked copolymers of a mixture of a monovinyl-aromatic hydrocarbon and a conventional copolymerizable crosslinking agent which contains at least two groups having the structure:

$$CH_2=C<$$

for example, a crosslinked, polymeric styrene resin, said crosslinking agent being present in amount of 0.25 to 10 mole percent, said copolymer having attached to the aromatic nuclei thereof groups having the structure $$-C_nH_{2n}-O-Z$$

and equivalents thereof, as hereinafter described, wherein $n$ is an integer from 1 to 4 and Z represents a polyol substituent group derived from sorbitol, mannitol, galactitol, talitol, arabitol, ribitol and mixtures thereof.

The resins of this invention are made by reacting a polyol, as described above, e.g., sorbitol, in the form of its alkali metal salt at an elevated temperature from about 70° to about 130° C. with a salt form sulfonium anion exchange resins such as described in United States patent application Serial No. 769,545, filed October 27, 1958, or United States Patent 2,895,925.

Alternatively, the resins of this invention can be made by reacting a polyol, as described above, e.g., sorbitol, in the form of its alkali metal salt at an elevated temperature from about 140° to about 200° C. with a salt form quaternary ammonium anion exchange resin, such as described in United States Patents 2,591,573 and 2,614,949. Thereby a polymeric crosslinked vinylbenzyl polyol ether resin is formed as shown by the following representative equations:

(1)

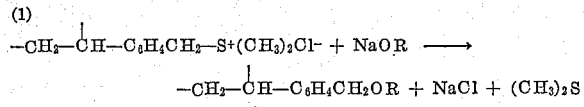

(2)

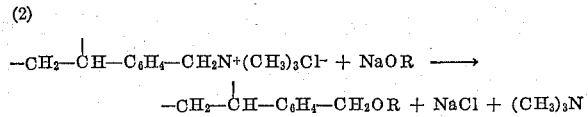

In the first equation, the first reactant represents the moiety of a crosslinked polymeric vinylbenzyl dimethylsulfonium chloride while in the second equation the first reactant represents the moiety of a vinylbenzyl trimethylammonium chloride. In both equations, R represents a polyol group, as previously described.

In the sulfonium resin route for making the polyol resins, the salt form water-swollen polymeric vinylbenzyl dimethylsulfonium resin, e.g., chloride or equivalent, crosslinked with between 0.25 and 10 mole percent divinylbenzene or other crosslinking agent is reacted by heating at about 70° to 130° C., e.g., on a steam bath or hot plate, with excess alkali metal salt of a polyol, e.g., sorbitol. Advantageously, excess polyol and excess concentrated aqueous alkali metal hydroxide over that required to react with the resin chloride are used so that sodium sorbitylate, $NaC_6H_{13}O_6$, is formed in situ. The reaction is advantageously carried to substantial completion, as indicated by cessation of gas evolution, e.g., dimethyl or other sulfide evolved during reaction. Usually a reaction time up to about 16 hours suffices. Generally, excess up to about 150 percent of theory of alkali metal hydroxide and up to about 10 times that of theory of polyol is utilized, both with respect to the resin chloride. Although sufficient water is present advantageously to dissolve the sorbitol and swell the resin, larger amounts of water relative to sorbitol should be avoided. Thus, it is advisable to have the total weight of water present in the reaction mixture no more than equal to the weight of sorbitol.

In the quaternary ammonium resin route for making the polyol resins, a substantially dry polymeric vinylbenzyl trimethylammonium chloride or equivalent quaternary ammonium anion exchange resin crosslinked with between about 0.25 and about 10 mole percent divinylbenzene or other crosslinking agent is reacted with a sodium or other alkali metal salt of a polyol in the presence of excess molten polyol at a temperature between about 140° and 200° C. The polyol sodium salt is used in excess over the theoretical resin chloride. Advantageously, dried quaternary ammonium halide resin is added to molten polyol, solid alkali metal hydroxide is then added thereto in amount at least equivalent to and preferably in excess of resin chloride and the mixture is heated to reaction temperature. An excess amount of polyol is used sufficient to swell and slurry the quaternary ammonium resin so that the reaction mixture can be readily stirred. A simple test suffices to indicate how much excess polyol to use for such purpose. Since the excess polyol can be recovered and reacted several times without removal of by-product sodium chloride, the amount of excess polyol is not material. Usually about 7.5 weight parts molten polyol is used per weight part of dry quaternary ammonium resin, equal to about 9 mole polyol per chemical equivalent of dry resin. Reaction is carried out to substantial completion, i.e., until cessation of gas evolution, mostly trimethyl or equivalent tertiary amine.

In both reaction routes, polyol ether groups are formed. Since the polyols can react at more than one hydroxyl group, in some instances the polyol is attached through more than one ether linkage. Any multiple attachment of polyol groups is no serious disadvantage since in the reaction sufficient vicinal hydroxyl groups always remain so that the resin maintains its high selectivity for the indicated metal and metalloid oxy anions. Thus, $-C_nH_{2n}-O-Z$ and $(-C_nH_{2n}-O-)_2Z$ substituent groups and mixtures thereof are attached to aromatic nuclei of the resins of this invention. In the first instance, Z is a polyol minus one hydroxyl group, while in the second instance Z is a polyol minus two hydroxyl groups.

The novel polyol ether resins of this invention are useful in selectively sorbing Group IIIA, IVA, VA and VIA metal and metalloid oxy anions by forming complexes therewith, even in the presence of high concentrations of light and heavy metal cations and other oxy anions. The light and heavy metalloid oxy anions which are selectively sorbed from aqueous solutions to form complexes with the resins of this invention are those of $B^{3+}$, $Ga^{3+}$, $Ge^{4+}$, $Sn^{4+}$, $Pb^{4+}$, $As^{3+}$ and $Te^{6+}$, generally represented as $BO_2^-$ $B_4O_7^=$, $Ga_2O_4^=$, $GeO_3^=$, $SnO_3^=$, $PbO_3^=$, $As_2O_4^=$ and $TeO_4^=$, whether as such or as hydrated anions, i.e., the water-soluble borate, gallate, germanate, stannate, plumbate, arsenite and tellurate anions.

The following examples describe completely representative specific embodiments and the best mode contemplated by the inventors for carrying out the invention. The examples are not intended to be limitative of the invention other than as claimed.

*Example 1*

Filtered, water-swollen beads of 50–100 mesh one percent divinylbenzene crosslinked polymeric vinylbenzyl trimethylammonium chloride (Dowex 1 resin, one weight part) is mixed with pelleted sorbitol (one weight part) and the combination is heated at 100° C. with stirring. The sorbitol-plus-water soon becomes homogeneous and the resulting mixture of liquid plus suspended resin beads is heated at up to 160° C. to distill off all water. The time in the dewatering step varies, depending on the size of the batch, equipment used, etc.

After dewatering, the system is viscous but stirrable. One and two-tenths moles sodium hydroxide per equivalent weight resin (the weight containing one formula weight of quaternary ammonium chloride groups) in the form of aqueous 50 percent (ca. 18 N) solution is added slowly to the stirred pot at about 160° C. Much gas, mainly trimethylamine and water vapor, is evolved as the NaOH is added, and the resin becomes dark near the end of the addition. After 1 to 2 hours, the viscosity increases almost to the nonstirrable state. After approximately 8 hours at 160°–180° C. the reaction is apparently complete as evidenced by a termination of the gas evolution and by a decrease in the viscosity of the medium. The resulting mixture is filtered hot (110° to 150° C.) and washed with boiling water (to prevent thermal shock fracturing) and then with room temperature water. Its capacity for absorbing boron from an aqueous solution containing one weight percent NaCl and 2 weight percent $Na_2B_4O_7 \cdot 10H_2O$ varies between ca. 0.4 and 0.8 meq./ml. wherein one meq. of boron corresponds to 1/1000 gram atomic weight of boron contained in the borax compound.

*Example 2*

The reaction vessel is charged with solid sorbitol (plus desired melted sorbitol, if any, from previous run) to equal about 9 moles and the temperature is raised to above 100° C. to give an easily stirred melt. Then one mole of Dowex 1 resin, as described in Example 1, of the desired mesh size and crosslinking is added, followed by slow, stepwise addition of solid NaOH pellets. (Moles equivalent to or 20 percent greater than moles resin.) Gas evolution and some foaming always accompany the addition of NaOH.

The mixture is then heated at 150°–180° C. at least until little or no evolution of trimethylamine gas occurs. The resin is then filtered from the hot melt and is then washed with boiling water, then with cool water. The hot melt of excess sorbitol is saved, if desired, for use in a succeeding run. Capacity of the sorbitol ether resin beads varies between ca. 0.4 and 0.8 meq. B/ml.

*Example 3*

A kettle is charged with 276 lbs. (1.5 lb. mole) of pelleted sorbitol which is heated to approximately 160° C. and 35.3 lbs. (0.163 lb. mole) of the dried (2 percent $H_2O$) Dowex 1-X1, 50–100 mesh Cl⁻ form resin, as described above, is added. After the resin has swollen and the mixture is semiviscous, 8.16 lbs. (0.204 lb. mole) of flake sodium hydroxide is added. Evolution of amine occurs, and although no foaming occurs initially, after approximately one hour the foaming starts (ca. 180° C.) and at the end of 3 hours the foaming has increased the total volume to approximately 2½ times the original volume. Further foaming is controlled by supplemental agitation and some reduction in steam pressure. After approximately 4 hours, the foaming begins to subside and after a total heating time of 8 hours it has completely dissipated.

At this time, the kettle contents are dropped into a filter and are pulled into a holding tank by using a steam-jet vacuum. The resin is then cooled to 110° to 125° C. and washed with 95° C. water to minimize breakage. After the resin has cooled to the 95° C. level, washing is continued with cold tap water until 15–20 bed volumes of water have gone through and the resin surface is almost all clear and non-sticky. (A small percentage of resin may be occluded in a few sticky lumps of cold sorbitol in spite of the water wash. It is recoverable separately after soaking the lumps in water to dissolve them.) The filtered resin is then centrifuged. Weight of product is then 57.3 lbs., moisture content is 39 percent and bulk volume is 1.38 cu. ft.

The filtrate (excess sorbitol) is pumped back into the reaction kettle, 105 lbs. of make-up sorbitol is added plus 35.3 lbs. of dried resin, as specified above, and 8.16 lbs. of flake sodium hydroxide, and a second run then proceeds like the first. Another 1.4 cu. ft. of product is produced and the filtrate from the second run is used together with 105 lbs. of make-up sorbitol, 35.3 lbs. of dried resin and 8.16 lbs. of sodium hydroxide to make a third and final batch. The excess salt-containing sorbitol is filtered from the third batch with some difficulty. It may be discarded.

*Example 4*

A sample 50–100 mesh one percent divinylbenzene-crosslinked polymeric vinylbenzyl dimethylsulfonium resin having a capacity of 0.368 meq./ml. is air-dried to 43.3 percent $H_2O$ by blowing with room temperature air while being held in a fritted glass funnel. The air-flow is back-blown through the funnel at a rate of approximately 60–100 bed volumes, hereafter $V_B$, per minute. The resin at the 43.3 percent water content is flowable and does not cake. The Cl⁻ analysis at this water content is 3.41 meq./g.

A 58 g. (198 meq.) weight of the air-blown sulfonium resin is added to 472 g. of molten sorbitol in a stirred pot. Water vapor comes off. The temperature is raised from ca. 100° to 110° C. Foaming is moderate. Heating at this temperature is continued for ca. ½ hour. Considerable condensation occurs in the upper glassware. No condenser is used. A quantity of 9.5 g. (240 meq.) sodium hydroxide pellets is added. Foaming is increased for ca. 25 min. A strong dimethyl sulfide smell is evident. Foaming then decreases. Heating is continued for a period of one hour from the time NaOH is added.

Hot deionized water is added and the product resin is filtered off. The product resin is washed well with water, methanol, sodium chloride solution and water. The wet settled volume of product equals 107 ml. Percent water equals 47.0 percent. Residual chloride equals 0.1 meq./ml.

*Example 5*

A 500 ml. wet settled volume of the sulfonium resin, as described in the preceding example, is washed with 6–8 $V_B$ methanol and then with 6–8 $V_B$ methylene chloride. The volume is reduced by ⅓ in the methanol and shrinks to ca. ⅛ the original volume in methylene chloride. After air-blowing for a short time, ca. 5 minutes, the resin is added to 472 g. of molten sorbitol and swells, then gas evolution begins. A quantity of 7.4 g. (185 meq.) sodium hydroxide pellets is then added immediately. Bubbling continues for approximately another hour and then recedes. Water is added to the pot and the resin is worked by washing with hot water, methanol, sodium chloride solution and water.

The final wet settled volume is 148 ml. No resin cracking or breaking occurs as observed microscopically. Water content is 56.0 percent.

*Example 6*

To a cylindrical bed of water-washed sorbitol ether resin ¼ in. I.D. by 6¾ in., prepared by the sulfonium resin route as described in Example 5, was fed an aqueous solution of 18.9 g. per liter $Na_2B_4O_7 \cdot 10H_2O$ which also contains 10 g. sodium chloride at a rate of 2.45 gal./min./ft.², No substantial breakthrough of borate occurred until $2V_B$ of effluent was collected. At $5V_B$ of effluent, 50 percent of the borate in the feed solution was still being removed by the resin. The loaded resin bed is eluted with 0.1 N hydrochloric acid until the eluent is substantially borate ion free.

The above resin also absorbed borate anions selectively from an aqueous 25 percent magnesium chloride solution.

*Example 7*

The procedure of Example 6 is repeated using a 50 ml. column of sorbitol ether resin contained in a 50 ml. burette and an aqueous feed of 0.00157 molar (0.201 percent, 2010 p.p.m. $Te^{VI}$) $K_2TeO_4 \cdot 2H_2O$. A total of 400 ml. of solution is passed through the column, while 25 ml. effluent cuts are collected except for the last two which are 50 ml. cuts. All of the $Te^{VI}$ as $TeO_4^=$ was sorbed by the resin.

*Example 8*

A solution of 0.1000 normal alkaline $Na_2As_2O_4$ is mixed with 10.0 g. $Na_2SO_4$ (anhydrous) and the mixture is diluted with distilled water to 500 ml. The solution is passed through a cylindrical ca. ½ in. x ca. 22 in. 100 ml. bed of sorbitol ether resin at a flow rate of ca. 0.2 gal./min./ft.$^2$ until 100 ml. of effluent is collected in 25 ml. cuts, then the flow rate is increased to ca. 0.6 gal./min./ft.$^2$ until another 100 ml. of effluent is collected, and finally the flow rate is increased to 1.2 gal./min./ft.$^2$ until a final 275 ml. of effluent is collected. The total effluent collected in 25 ml. cuts is 475 ml. No $As^{III}$ is detected in any of the effluent using the analytical method of Pierce and Henisch, Quantitative Analysis, 3d ed., 1948, page 216, so that all of the arsenite oxy anion is sorbed by the resin, within the limits of the analytical method. After a water wash, $As^{III}$ can be removed gradually from the sorbitol ether resin by rinsing with one-normal hydrochloric acid.

The procedure above, when repeated with an aqueous 0.05 normal alkaline $Na_2As_2O_4$ solution containing 20 g. $Na_2SO_4$ per liter gives equally good results in that no $As^{III}$ breakthrough is detectable.

*Example 9*

An aqueous alkaline solution containing 6.1% $Na_2SO_4$
1.4% $ZnSO_4$, as zincate
10.1% NaOH
170 p.p.m. $Sn^{IV}$ as stannate
160 p.p.m. $Pb^{IV}$ as plumbate
120 p.p.m. $Ga^{III}$ as gallate
70 p.p.m. $Se^{VI}$ as selenate
170 p.p.m. $As^V$ as arsenate is passed through a 62 cm. deep bed of sorbitol ether resin, as characterized above, at a rate of 0.2 gal./min./ft.$^2$ until 200 ml. of effluent is collected, then at a rate of 0.6 gal./min./ft.$^2$ until another 550 ml. of effluent is collected.

Analyses are run on samples collected at effluent volumes as follows:

| Cut Vol., ml. | Cut No. | Vol. Effluent at Start of Cut, ml. |
|---|---|---|
| 20 | 5 | 80 |
| 20 | 10 | 180 |
| 50 | 12 | 225 |
| 50 | 20 | 650 |

None of the cuts show the presence of $Sn^{IV}$, $Ga^{III}$, $Pb^{IV}$, showing that their oxy anions are sorbed by the resin. All of the cuts show feed concentrations of $Se^{VI}$ and $As^V$, the oxy anions of which are not sorbed by the resin.

*Example 10*

An aqueous solution containing 0.018 g./l. of germanium and 4.3 normal in $Zn^{++}$, having a density of 1.3142 g./ml. at 25° C. and a pH of 5.5 is treated in three different ways with the sorbityl ether resin of Example 3.

A. One liter of the aforesaid solution is batch-contacted with 50 ml. of the sorbitol ether resin for 24 hours at room temperature. The resin is then filtered from the solution, which is quite clear. The filtrate then contains only 0.0005 g./l. of germanium.

B. One liter of solution is twice batch-equilibrated with 10 ml. portions of the sorbityl ether resin for 24 hours at room temperature. The resin is then filtered from the solution. The filtrate then contains only 0.0003 g./l. of germanium.

C. One liter of pre-heated degassed solution is passed through an 18-inch bed of sorbityl ether resin contained in a 100 ml. burette having a plug of glass wool in the bottom. The burette is heated to 75° C. by surrounding hot water contained in a glass jacket. Flow rate is ca. 0.6 gal./min./ft.$^2$. The solution is applied to the top of the bed, which bed is immersed in hot degassed pure water. The filtrate then contains 0.0001 g./l. germanium.

Similar advantageous results are obtained when other polyol ether resins, whether prepared by the sulfonium resin route or by the quaternary ammonium resin route, are used.

What is claimed is:

1. A water-insoluble copolymer of a vinyl-aromatic hydrocarbon crosslinked with 0.25 to 10 mole percent of a crosslinking agent containing at least two $CH_2=C<$ groups per mole, said copolymer having attached to aromatic nuclei thereof substituents of the group consisting of $-C_nH_{2n}-O-Z$ ($-C_nH_{2n}-O-)_2Z$ and mixtures thereof, wherein $n$ is an integer from 1 to 4 and Z represents a polyol substituent group derived from sorbitol, mannitol, galactitol, talitol, arabitol and ribitol and mixtures thereof.

2. The product of claim 1 wherein the crosslinking agent is divinylbenzene.

3. The product of claim 1 wherein the crosslinking agent is divinylbenzene and Z represents a polyol substituent group derived from sorbitol.

4. A method for making a water-insoluble polyol ether-substituted complexing resin by reacting at an elevated temperature at least an equivalent amount of an alkali metal salt of a polyol of the group consisting of sorbitol, mannitol, galactitol, talitol, arabitol, ribitol and mixtures thereof with a salt form anion exchange resin of the group consisting of polymeric vinylbenzyl quaternary ammonium and polymeric vinylbenzyl sulfonium resins which are crosslinked with between about 0.25 and 10 mole percent of a crosslinking agent having at least two $CH_2=C<$ substituent groups, the reaction temperature being about 70° to about 130° C. when said sulfonium resin is reacted, and about 140° to about 200° C. when said quaternary ammonium resin is reacted.

5. The method of claim 4 wherein the polyol is sorbitol.

6. A method for removing metal and metalloid oxy anions of the group consisting of borate, germanate, stannate, plumbate, gallate, arsenite and tellurate oxy anions and mixtures thereof from an aqueous solution which may also contain light and heavy metal cations and other oxy anions by contacting said aqueous solution with a particulate water-insoluble copolymer of a vinylaromatic hydrocarbon crosslinked with 0.25 to 10 mole percent of a crosslinking agent containing at least two $CH_2=C<$ groups per mole, said copolymer having attached to aromatic nuclei thereof substituents of the group consisting of $-C_nH_{2n}-O-Z$ ($-C_nH_{2n}-O-)_2Z$ and mixtures thereof, wherein $n$ is an integer from 1 to 4 and Z represents a polyol substituent group derived from sorbitol, mannitol, galactitol, talitol, arabitol and ribitol and mixtures thereof and separating said aqueous solution from said resin.

7. The method of claim 6 wherein the aqueous solution is passed through a bed of said polyol ether resin.

8. The method of claim 6 wherein the oxy anion is a borate.

9. The method of claim 6 wherein the resin is a sorbityl ether resin.

10. The method of claim 6 wherein the oxy anion is a borate and the resin is a sorbityl ether resin.

11. The method of claim 6 wherein the oxy anion is gallate and the resin is a sorbityl ether resin.

12. The method of claim 6 wherein the oxy anion is germanate and the resin is a sorbityl ether resin.

No references cited.

SAMUEL H. BLECH, *Primary Examiner.*

C. A. WENDEL, *Assistant Examiner.*